United States Patent
Goldsby

(10) Patent No.: US 12,070,983 B2
(45) Date of Patent: Aug. 27, 2024

(54) SYSTEM FOR REDUCING SHAKE FOR A VEHICLE HAVING A SOLID FRONT AXLE

(71) Applicant: Glenn M. Goldsby, Woodland Hills, CA (US)

(72) Inventor: Glenn M. Goldsby, Woodland Hills, CA (US)

( * ) Notice: Subject to any disclaimer, the term of this patent is extended or adjusted under 35 U.S.C. 154(b) by 0 days.

(21) Appl. No.: 18/036,185

(22) PCT Filed: Oct. 20, 2022

(86) PCT No.: PCT/US2022/047309
§ 371 (c)(1),
(2) Date: May 10, 2023

(87) PCT Pub. No.: WO2023/069642
PCT Pub. Date: Apr. 27, 2023

(65) Prior Publication Data
US 2023/0382177 A1 Nov. 30, 2023

Related U.S. Application Data

(60) Provisional application No. 63/257,911, filed on Oct. 20, 2021.

(51) Int. Cl.
*B60G 21/05* (2006.01)
*B60G 7/00* (2006.01)
*B60G 11/18* (2006.01)

(52) U.S. Cl.
CPC ............ *B60G 21/05* (2013.01); *B60G 7/005* (2013.01); *B60G 11/18* (2013.01);
(Continued)

(58) Field of Classification Search
CPC ........ B60G 21/05; B60G 7/005; B60G 11/18; B60G 2202/135; B60G 2204/416
See application file for complete search history.

(56) References Cited

U.S. PATENT DOCUMENTS

| | | | | |
|---|---|---|---|---|
| 2,351,651 A | * | 6/1944 | Wulff | B60K 5/1216 |
| | | | | 280/124.141 |
| 3,240,509 A | * | 3/1966 | Pierce | F16C 11/0676 |
| | | | | 403/126 |

(Continued)

FOREIGN PATENT DOCUMENTS

GB 2351952 A * 1/2001 ............... B60G 9/00

OTHER PUBLICATIONS

Feb. 1, 2023—(WO) International Search Report & Written Opinion—App. No. PCT/US2022/047309.

*Primary Examiner* — Frank B Vanaman
(74) *Attorney, Agent, or Firm* — Banner & Witcoff, Ltd.

(57) ABSTRACT

An assembly comprises an upper axle ball joint support torque box, torque tube, torque tube support housing, forward torque rod, and forward torque rod support. The upper axle ball joint support torque box is configured to connect to an upper axle ball joint mount of a solid front axle of a vehicle. The torque tube support housing is configured to connect to the upper ball joint support torque box. The forward torque rod is configured to connect to the forward torque rod support and the torque tube. The forward torque rod support is configured to connect to frame structure of the vehicle. The torque tube support housing is configured to slide forward and backward along the torque tube. The assembly may comprise an anti-twist bracket configured to connect to the ball joint support torque box. The assembly, when installed, reduces side-to-side shaking of the solid front axle vehicle.

22 Claims, 6 Drawing Sheets

(52) U.S. Cl.
CPC .. *B60G 2202/135* (2013.01); *B60G 2204/416* (2013.01); *B60G 2800/012* (2013.01)

(56) References Cited

U.S. PATENT DOCUMENTS

| | | | | |
|---|---|---|---|---|
| 3,612,503 | A | | 10/1971 | Tanno |
| 3,701,542 | A | * | 10/1972 | Grosseau ............... B60G 21/05 280/124.167 |
| 4,422,666 | A | * | 12/1983 | Proctor ................ B60G 17/023 280/124.171 |
| 5,630,609 | A | | 5/1997 | Shin |
| 5,931,485 | A | * | 8/1999 | Modinger ............... B62D 17/00 280/86.75 |
| 6,045,146 | A | * | 4/2000 | Schoen ..................... F16F 1/14 280/124.106 |
| 2006/0244232 | A1 | * | 11/2006 | Cortez ..................... B60G 7/00 280/124.109 |
| 2007/0114746 | A1 | * | 5/2007 | Tucker .................... B60G 9/00 280/124.116 |
| 2009/0134594 | A1 | * | 5/2009 | Kiselis .................. B60G 7/008 280/124.134 |
| 2010/0090432 | A1 | | 4/2010 | Hauser et al. |
| 2011/0233880 | A1 | | 9/2011 | Lee |
| 2016/0200164 | A1 | * | 7/2016 | Tabata ................ B60G 21/073 280/5.508 |
| 2020/0307331 | A1 | * | 10/2020 | Senoo ..................... B60G 7/04 |
| 2021/0283975 | A1 | | 9/2021 | Cox |

\* cited by examiner

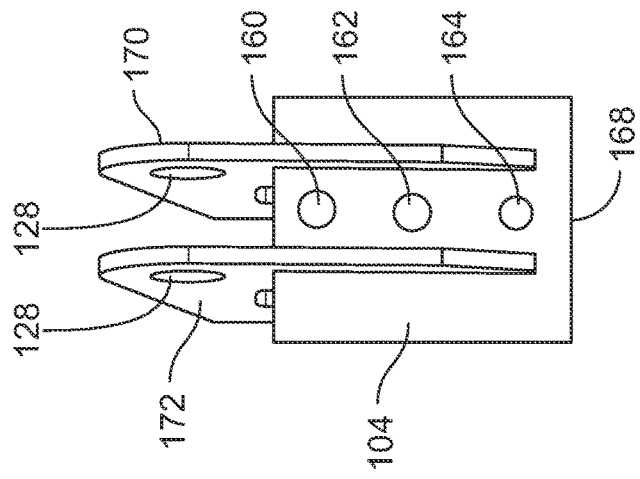
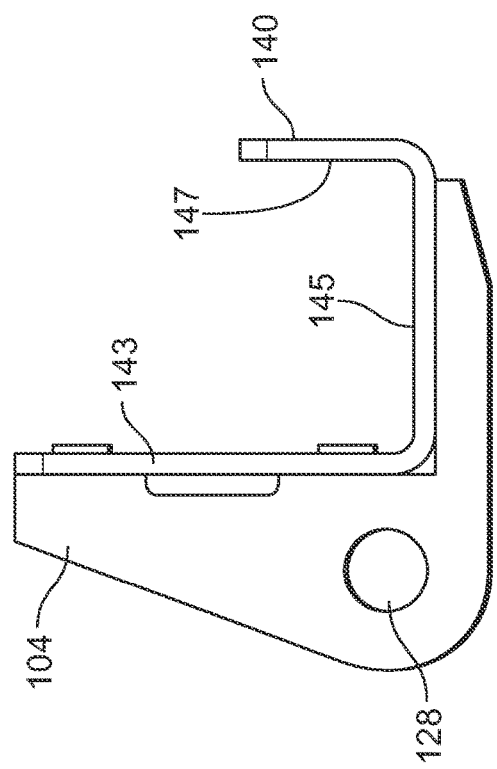
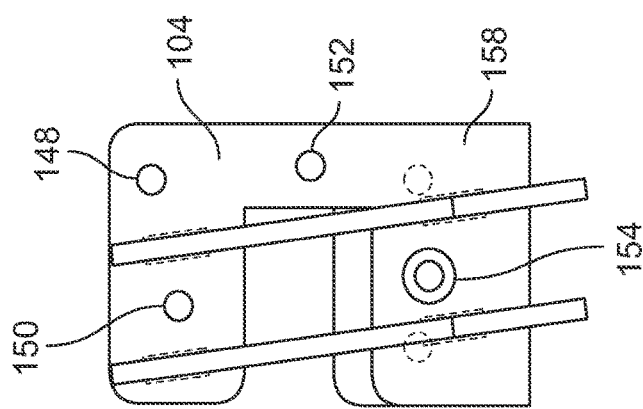

SYSTEM FOR REDUCING SHAKE FOR A VEHICLE HAVING A SOLID FRONT AXLE

CROSS-REFERENCE TO RELATED APPLICATIONS

This application is a U.S. National Stage application under 35 U.S.C. § 371 of International Application PCT/US2022/047309, filed Oct. 20, 2022, which claims the benefit of priority to U.S. Provisional Application No. 63/257,911, filed on Oct. 20, 2021, and entitled "System for Reducing Shake for A Vehicle Having A Solid Front Axle." This application claims the benefit of the filing date of each of these prior applications. The content of each prior filing is expressly incorporated herein.

TECHNICAL FIELD

The present invention relates to a system that reduces shake or shimmy for a vehicle having a solid or straight front axle.

BACKGROUND

Vehicles with a solid or straight front axle (rather than independent front suspension) may not effectively damp oscillation of the steering system, resulting in a sustained shake or shimmy in the steering wheel. See e.g., Fiat Chrysler Automobiles Customer Satisfaction Notification V41 Steering Damper, Rev. 6 Nov. 2019. A sustained shake or shimmy may be more noticeable when driving such vehicles at speeds exceeding fifty-five (55) miles per hour (mph)/eighty-eight (88) kilometers per hour (kph) after contacting a bumpy road surface and in temperatures below 40° Fahrenheit (5° Celsius). Id. Attempts to correct this sustained shake or shimmy problem include the repair of replacing the front suspension damper on involved vehicles with a new steering damper. Id. Some vehicle owners have not been satisfied by such repair and allege that replacing the front suspension damper on involved vehicles with a new steering damper does not remediate the problem.

The shake or shimmy problem has been referred to by some as "death wobble." Some have indicated that swapping out the vehicle's steering stabilizer to a stronger version does not resolve death wobble and tends to mask the underlying issues.

Another approach to correct a sustained shake or shimmy is to replace the solid front axle with an independent front suspension. This approach has disadvantages. For example, many users want a vehicle for off-road purposes and having a solid front axle allows for more travel of the suspension for off-road purposes than an independent front suspension.

US 2009/0102152 discloses front and rear axle radius arms. The reference states that the rear axle radius arm reduces chassis-induced roll oversteer and improves handling and safety both on and off road.

Some solid front axle vehicles are manufactured in the factory with elevated or raised suspensions. Some solid front axle vehicles are modified for off-road purposes by raising the suspensions of those vehicles after they have come off the factory line. The sustained shake or shimmy problem can become greater when a solid front axle vehicle is manufactured or modified with a raised suspension. Raised suspensions of solid front axle vehicles, however, creates an inherent problem with the steering geometry and distance of spring travel. While raising the suspension allows for more travel of the suspension desirable for off-road use, the raised suspension makes driving on surface roads more unstable. More specifically, the amount of travel with a raised suspension can result in a sustained shake or shimmy as noted above, which makes the vehicle more difficult to drive, forcing the driver to correct for the sustained shake or shimmy by fighting to keep the vehicle in the center of the road lane.

Conventional after-market products do not satisfactorily reduce the above-referenced sustained shake or shimmy problem. There is a need for a system that can reduce the sustained shake or shimmy problem for vehicles having a solid front axle, such as solid front axle 4×4 vehicles. It would be advantageous to have system that acts as a track location device that compliments an installed factory system. It would be advantageous to have such a system that can be readily installed in solid front axle vehicles by the vehicle manufacturer at the factory, by the seller at point of sale (e.g., at a car dealership), or by a mechanic as an after-market product. It would be beneficial to have a suspension device that can be readily disabled for extreme off-road conditions requiring maximum travel.

SUMMARY

Briefly, the present invention is a system comprising an assembly. In an embodiment, the assembly is a kit comprising an upper ball joint support torque box, a torque tube, a torque tube support housing, a forward torque rod, and a forward torque rod support. The upper ball joint support torque box is configured to be connected to an upper axle ball joint mount of a vehicle having a solid front axle. The torque tube support housing is configured to be connected to the upper ball joint support torque box. The forward torque rod comprises a first end configured to be connected to a forward portion of the torque tube and a second end configured to be connected to the forward torque rod support. The forward torque rod support is configured to be connected to a frame structure of a vehicle.

In an embodiment, the torque tube support housing comprises sleeve bearing ends. In an embodiment, the torque tube support housing, including its sleeve bearing ends, is configured to slide forward and backward along the torque tube. In an embodiment, the second end of the forward torque rod comprises a ball joint rod end, wherein the ball joint rod end comprises a ball swivel defining a cylindrical hole through the ball swivel, wherein the cylindrical hole has a longitudinal axis. In an embodiment, the forward torque rod is configured to pivot up and down about the longitudinal axis of the cylindrical hole defined by the ball swivel of the ball joint rod end. In an embodiment, the assembly comprises an anti-twist bracket, wherein the anti-twist bracket is configured to connect to the upper ball joint support torque box and to capture an upper axle ball joint mount of a vehicle having a solid front axle. In an embodiment, the forward torque rod may be adjustable, e.g., by adjusting the length of the forward torque rod at the ball joint rod end.

In an embodiment, the system comprises the assembly recited above, wherein the assembly is assembled. In an embodiment, when the assembly is assembled, the upper ball joint support torque box is connected to an upper axle ball joint of a solid front axle of a vehicle. The torque tube support housing, including its sleeve bearing ends, is configured to slide forward and backward along the torque tube. In an embodiment, the forward torque rod support is connected to a frame structure of the vehicle. In an embodiment, the assembly comprises an anti-twist bracket, wherein the anti-twist bracket is connected to the upper ball joint support torque box and captures an upper axle ball joint mount of the vehicle. In an embodiment, when the upper axle ball joint mount rises, the upper axle ball joint support box rises, the torque tube housing slides forward towards the front of the vehicle, and the forward torque rod pivots upward. In an embodiment, when the upper axle ball joint mount descends, the upper axle ball joint support box descends, the torque tube housing slides backward towards the rear of the vehicle, and the forward torque rod pivots downward.

It is an object, feature and aspect of the invention to provide a system that improves the safety of vehicles having a solid front axle, including but not limited to, vehicles have a raised suspension, e.g., a raised suspension with lift springs.

It is an object, feature and aspect of the invention to provide a system that improves the driving experience of users of vehicles having a solid front axle.

It is an object, feature and aspect of the invention to provide a system that reduces the sustained shake or shimmy problem for vehicles having a solid front axle.

A further object, feature and aspect of the invention to provide a system that acts as a track location device that compliments an installed factory system.

Another object, feature and aspect of the invention to provide a system that can be readily installed in solid front axle vehicles by the vehicle manufacturer at the factory, by the seller at point of sale (e.g., at a car dealership), or by a mechanic as an after-market product.

Yet a further object, feature and aspect of the invention to provide a system that can be readily switched from a surface road mode to an extreme off-road mode and vice-a-versa.

Another object, feature and aspect of the invention wherein the system can be readily disabled for extreme off-road conditions requiring maximum travel.

These and other objects, advantages, aspects and features of the invention are set forth in the detailed description that follows.

BRIEF DESCRIPTION OF THE DRAWINGS

In the following detailed description, reference is made to the following Figures.

FIG. 6A is side view of a forward torque rod support shown in FIG. 4.

FIG. 6B is a front view of the forward torque rod support shown in FIG. 4.

FIG. 6C is a bottom view of the forward torque rod bracket support shown in FIG. 4.

DETAILED DESCRIPTION

Figure 2:
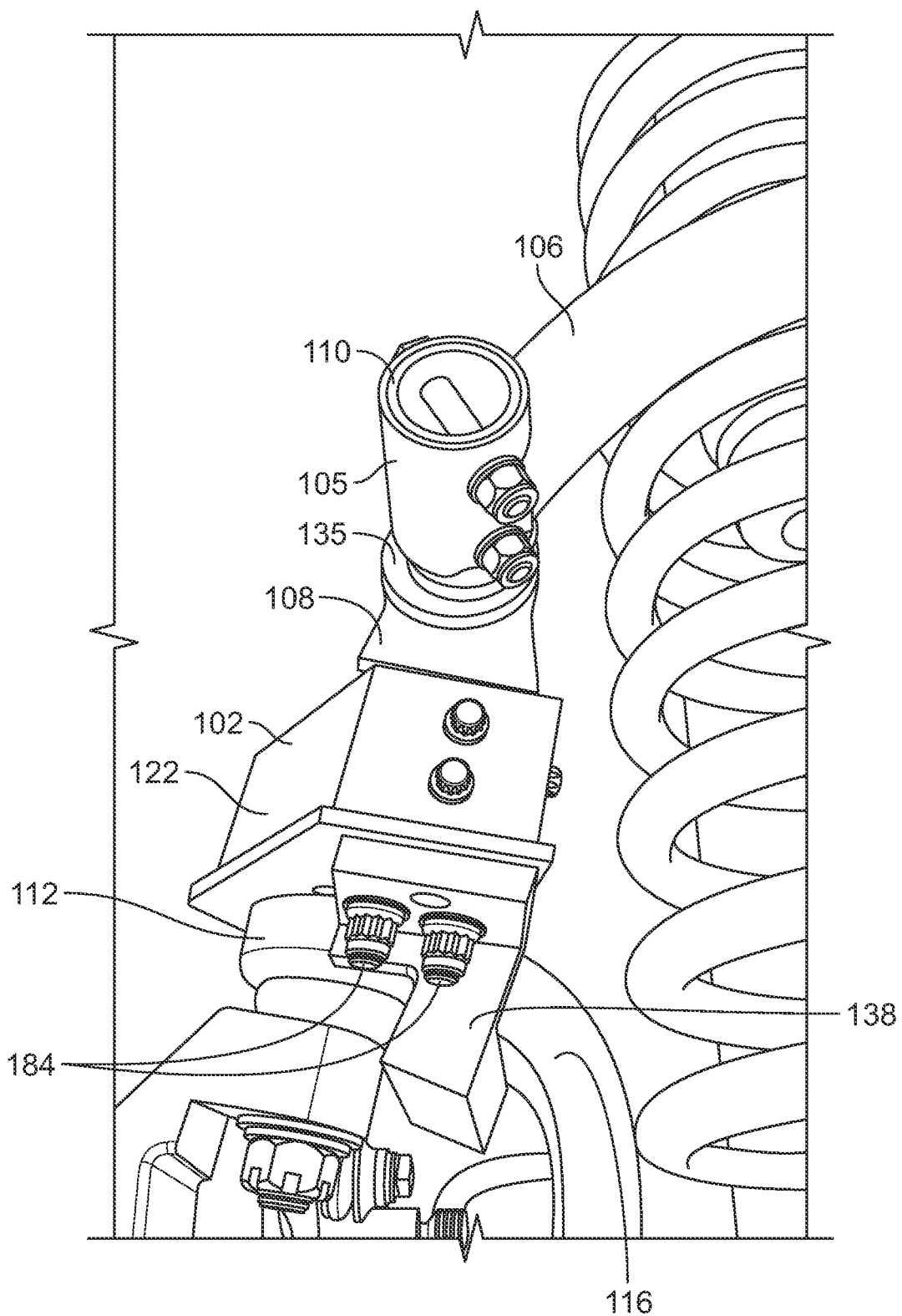
FIG. 2 is a bottom perspective view showing aspects of the embodiment shown in FIG. 1.
Figure 3:
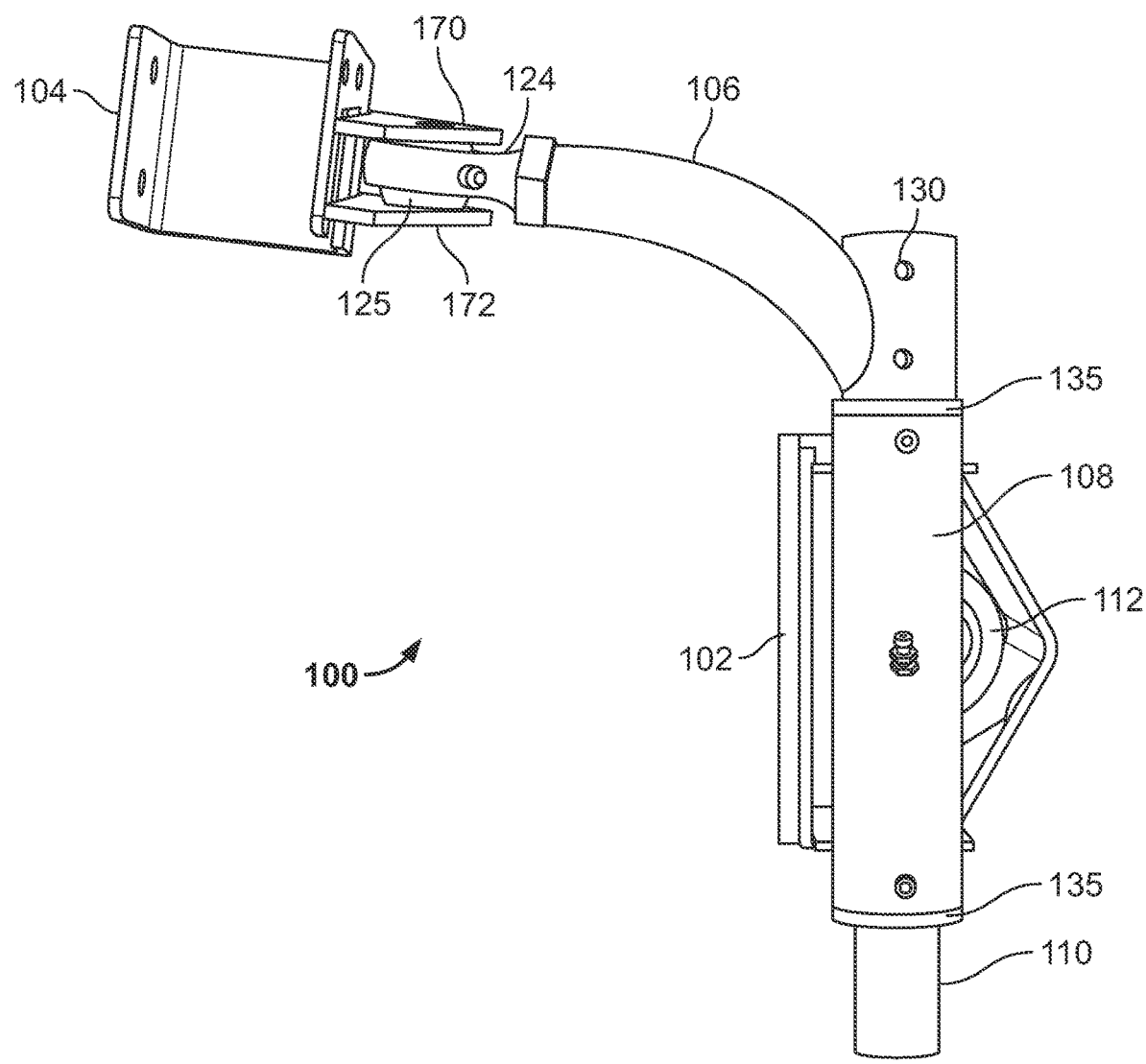
FIG. 3 is a top view showing aspects of an assembly in relation to an upper axle ball joint in accordance with aspects of the invention.
Figure 4:
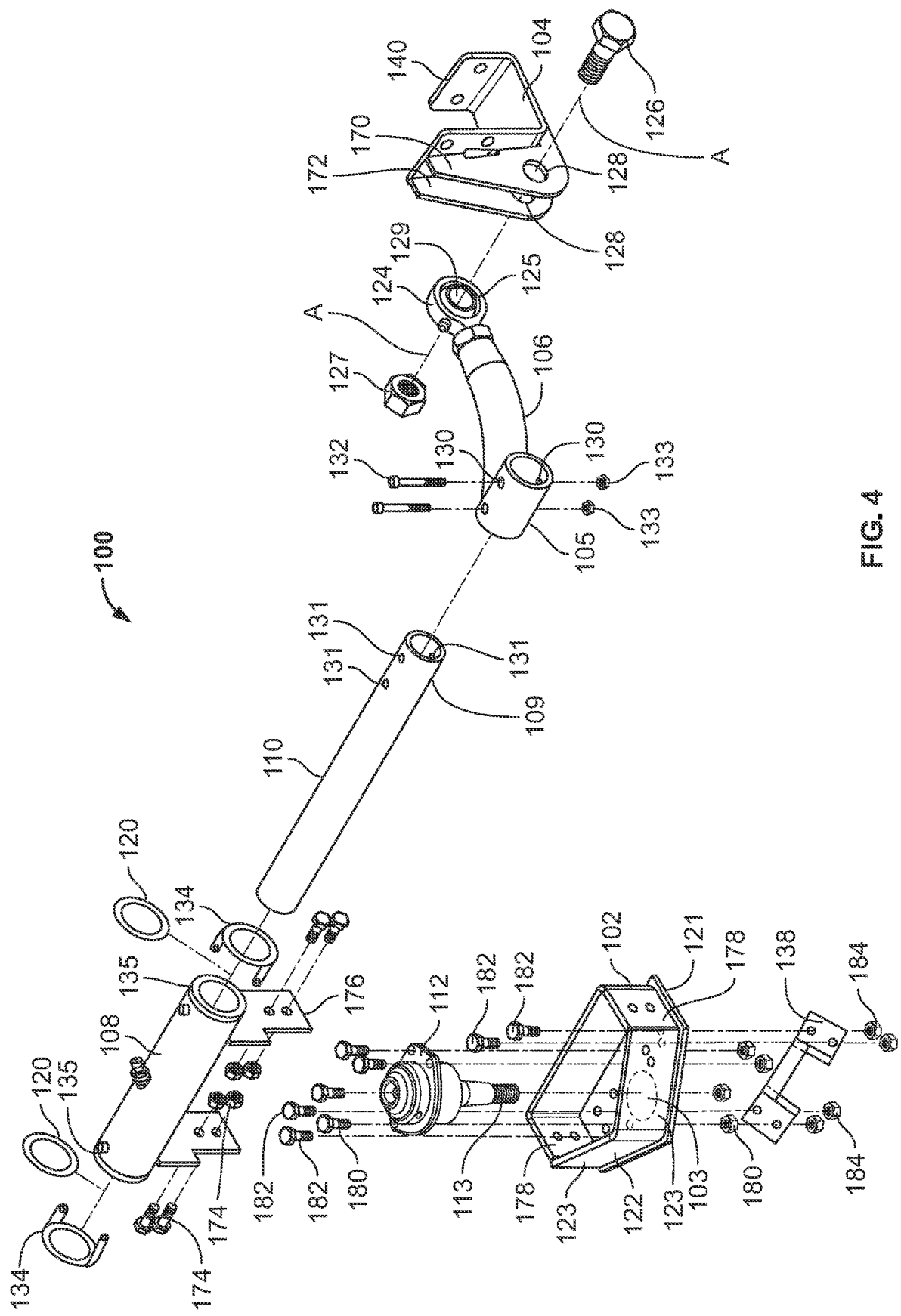
FIG. 4 is an exploded view of an assembly in relation to an upper axle ball joint of a vehicle in accordance with aspects of the invention.

Aspects of the invention are depicted in FIG. 1 through FIG. 6C. FIG. 4 is an exploded view of an assembly in relation to an upper axle ball joint of a vehicle in accordance with aspects of the invention. In reference to FIG. 4, in an embodiment, assembly 100 comprises upper ball joint support torque box 102, torque tube 110, torque tube support housing 108, forward torque rod 106, ball joint rod end 124 and forward torque rod support 104. Ball joint rod end 124 is known in the art as a rod end bearing, or heim joint (in North America) or rose joint (in the U.K. and elsewhere). Upper ball joint support torque box 102 is configured to be connected to an upper axle ball joint mount of a vehicle having a solid front axle, such as upper axle ball joint mount 112 shown in FIG. 4. Torque tube support housing 108 has sleeve bearing ends 135 and is configured to be connected to upper ball joint support torque box 102. Torque tube support housing 108, including sleeve bearing ends 135, is configured to slide forward and backward along torque tube 110. Forward torque rod 106 comprises first end 105 configured to be connected to forward portion 109 of torque tube 110. Forward torque rod 106 comprises a second end, i.e., ball joint torque rod 124, configured to be connected to forward torque rod support 104. As shown in FIG. 4, ball joint torque rod 124 comprises ball swivel 125. Ball swivel 125 defines cylindrical hole 129, wherein cylindrical hole 129 has a longitudinal axis A-A as depicted in FIG. 4. In an embodiment, forward torque rod 106 is configured to pivot up and down about longitudinal axis A-A of cylindrical hole 129 defined by the ball swivel 125 of the ball joint rod end 124.

Figure 1:
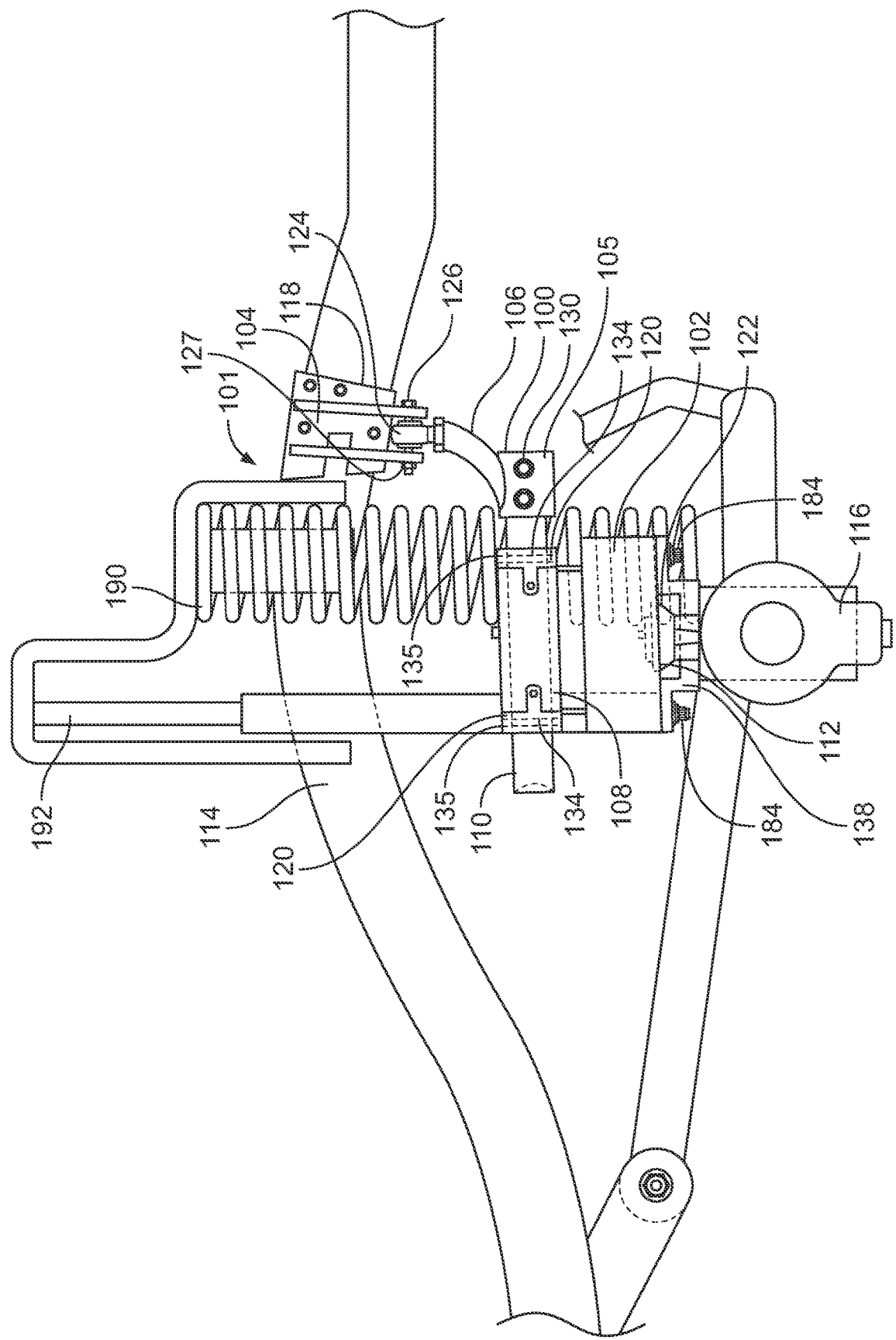
FIG. 1 is a perspective, partially cut-away side view depicting an embodiment of a system in accordance with aspects of the invention.

Forward torque rod support is 104 is configured to be connected to a frame structure of a vehicle, e.g., frame structure 114 as shown in FIG. 1. In an embodiment, assembly 100 comprises anti-twist bracket 138, wherein anti-twist bracket 138 is configured to connect to the upper ball joint support torque box and to capture upper axle ball joint mount 112 of a vehicle having a solid front axle, such as solid front axle 116 shown in the FIG. 1.

As shown in FIG. 1, system 101 comprises assembly 100 shown in FIG. 4, as assembled, wherein assembly 100 further comprises anti-twist bracket 138. As shown in FIG. 1, anti-twist bracket 138 is connected to the upper ball joint support torque box and captures upper axle ball joint mount 112 of a vehicle having solid front axle 116. As shown in FIG. 1, upper ball joint support torque box 102 is connected to upper axle ball joint mount 112 of solid front axle 116 of a solid front axle vehicle. As shown in FIG. 1 and FIG. 4, assembly 100 may comprise a linear grease seal 120 and a linear grease seal housing 134 at each sleeve bearing end 135 of torque tube support housing 108. As shown in FIG. 1, the vehicle comprises suspension spring 190 and shock absorber 192. At each sleeve bearing end 135, grease seal housing 134 goes around grease seal 120 and sleeve bearing end 135.

Forward torque rod support 104 is configured to connect directly to frame structure 114 of the solid front axle vehicle. As shown in FIG. 1, forward torque rod support 104 is attached to frame structure 114 at location 118 of frame structure 114. As shown in FIG. 1, location 118 of frame structure 114 is closer to the front of the vehicle than the upper axle ball joint mount, and is above the upper ball joint support torque box.

In an embodiment, upper axle ball joint support torque box 102 has angled portion 122, as shown in FIG. 2 and FIG. 4. As shown in FIG. 4, angled portion 122 comprises angled faces 123, and bottom 121 of upper axle ball joint support box has a pentagon shape. Angled portion 122 is configured to accommodate connection of upper ball joint support torque box 102 to upper axle ball joint mount 112. Bottom 121 defines opening 103, wherein stem 113 of upper axle ball joint mount 112 may be inserted and connect to solid front axle 116.

In an embodiment, forward torque rod 106 on the frame side is configured to be attached to forward torque rod support 104 through a ball joint rod end 124 by bolt 126 and nut 127. As shown in FIG. 4, bolt 126 is configured to be inserted through openings 128 of forward torque rod support 104 through a ball joint rod end 124 and opening 129 of ball joint rod end 124, wherein bolt 126 is fastened to forward torque rod support 104 by nut 127. Forward torque rod 106 is configured to be attached on the axle side to forward portion 109 of torque tube 110 by bolts 132 inserted through openings 130 of forward torque rod 106 and openings 131 of torque tube 110, wherein bolts 132 are fastened to forward torque rod 106 by nuts 133. As shown in FIG. 4, forward torque rod 106 is configured to receive forward portion 109 of torque tube 110 that defines openings 131.

The combination of upper axle ball joint support box 102, torque tube 110, torque tube support housing 108, forward torque rod 106, and forward torque rod support 104, may be assembled and attached to upper axle ball joint mount 112 and vehicle frame structure 114 as shown in FIG. 1. When assembled, the combination allows for torque tube 110 to slide within torque rod tube support housing 108 and allows forward and rear movement that solid front axle 116 goes through during its pendulum-arc like travel movement of up and down. In an embodiment, when upper axle ball joint mount 112 rises, upper axle ball joint support box 102 rises, torque tube housing 108 slides forward towards the front of the vehicle, and forward torque rod 104 pivots upward. In an embodiment, when upper axle ball joint mount 112 descends, upper axle ball joint support box 102 descends, torque tube housing 108 slides backward towards the rear of the vehicle, and forward torque rod 104 pivots downward.

In an embodiment, forward torque rod 106 may each be adjustable in length to accommodate positioning of torque rod support 104 to frame structure 114 depending on dimensions the vehicle, e.g., axle length and frame structure dimensions. For example, a telescoping structure, such as a threaded shaft (not shown in the figures) is configured to telescope out of forward torque rod 106 to adjust the length of forward torque rod 106 so it's length is greater, and the threaded shaft (not shown in the figures) is configured to telescope into forward torque rod 106 to adjust the length of forward torque rod 106 so it's length is shorter, as may be desired.

FIG. 3 shows a top view of assembly 100 shown in FIG. 1. Components described herein and shown in other figures but not shown in FIG. 3, such as grease seal 120 and grease seal housing 134, may be present in assembly 100 as depicted in FIG. 3. As shown in FIG. 3 and FIG. 4, forward torque rod 106 comprises ball joint rod end 124, and ball joint rod end 124 comprises ball swivel 125. Ball joint rod end 124 of forward torque rod 106 is configured to be placed between bracket plates 170 and 172 of forward torque rod support 104, wherein cylindrical hole 129 defined by ball swivel 125 is aligned with openings 128 defined by forward torque rod support 104.

As shown in FIG. 4, bolt and nut combinations 174 may be used to attach plates 176 of torque tube support housing 108 to the inside of faces 178 of upper axle ball joint support torque box 102. As shown in FIG. 4, bolt and nut combinations 180 may be used to attach upper axle ball joint support torque box 102 to upper axle ball joint mount 112. The combination of bolts 182 and nuts 184 may be used to attach bottom 123 of upper axle ball joint support torque box 102 to anti-twist bracket 138. As depicted in FIG. 4, upper axle ball joint support mount 112 may be bolted through the bottom 103 of upper axle ball joint support box 102 with bolts of bolts and nut combinations 180 going through both openings in the housing of upper axle ball joint mount 112 and openings in upper axle ball joint housing support torque box 102, and fastened by corresponding nuts.

Figure 5A:
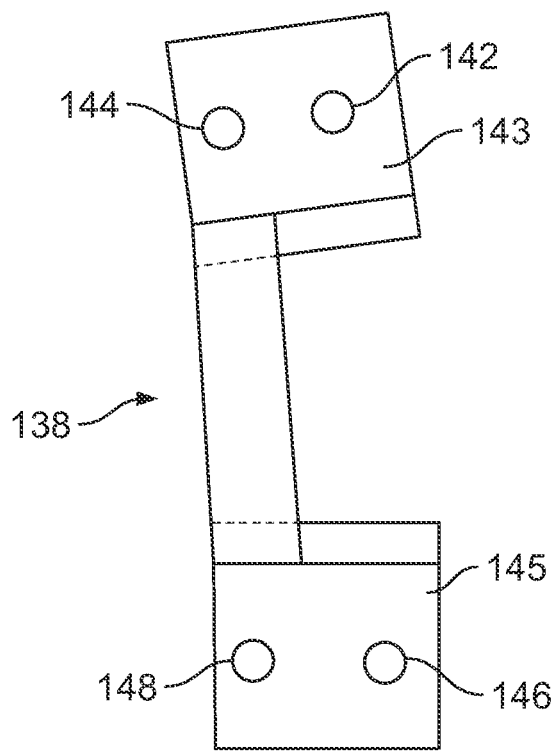
FIG. 5A is a top view depicting an anti-twist bracket in accordance with aspects of the invention.

Anti-twist bracket 138 comprises a U-shaped structure configured to capture axle 116. Anti-twist bracket 138 is configured to connect to the bottom face of bottom 121 of upper axle ball joint support torque box 102. When this configuration is assembled, anti-twist bracket 138 does not allow upper axle ball joint support torque box 102 to rotate or twist from forces being applied upon it from forward torque rod 106 via torque tube 110 via torque tube housing 108. Anti-twist bracket 138 mounts through the bottom face of upper axle ball joint support torque box 102 independent of upper axle ball joint mount 112. FIG. 5A is a top view of anti-twist bracket 138 depicted in FIG. 1.

Figure 5B:
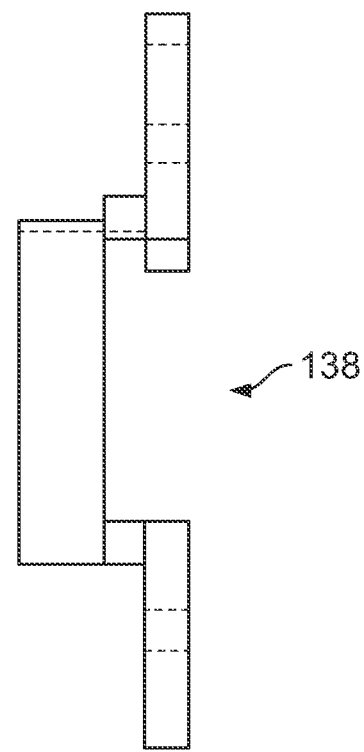
FIG. 5B is a side view of the anti-twist bracket shown in FIG. 5A.

FIG. 5B is a side view of anti-twist bracket 138 shown in FIG. 1. As shown in FIG. 5A, holes 142 and 144, holes 146 and 148 are defined along faces 143 and 145, respectively.

FIG. 6A is a side view of forward torque rod support 104 shown in FIG. 1 and FIG. 4. Lip 140, face 143 and face 145 of forward torque rod support 104 are configured to attach frame structure 114 at frame location 118. A structural high strength adhesive may be applied to the group consisting of face 147 of lip 140, face 143, face 145, and frame location 118, or combinations thereof.

FIG. 6B is a front view of the forward torque rod support 104 shown in FIG. 1, FIG. 4, and FIG. 6A. As shown in FIG. 6B, holes 148, 150, 152, and 154 are defined along face 158 of forward torque rod support 104. In an embodiment, hole 152 is larger than holes 148, 150, and 154. These holes are used for bolts that attach forward torque rod support 104 to vehicle frame structure 114.

FIG. 6C is a bottom view of forward torque rod support 104 shown in FIG. 6A. As shown in FIG. 6C, holes 160, 162, and 164 are defined along bottom face 168 of forward torque rod support 104. In an embodiment hole 162 is larger than holes 160 and 164. These holes are used for bolts that attach the bottom face of forward torque rod support 104 to vehicle frame structure 114.

As shown in FIG. 1, forward torque rod support 104 is configured to be mounted to frame structure 114 of a solid front axle at location 118. In a preferred embodiment, the location of mounting of forward torque rod support 104 is on the outboard side of frame structure 114.

LISTING OF ELEMENTS

100—Assembly
101—System
102—upper axle ball joint support torque box
103—opening defined by upper axle ball joint support box 102
104—forward torque rod support
105—first end of forward torque rod 106
106—forward torque rod
108—torque tube support housing
109—forward portion of torque tube 110
110—torque tube
112—upper axle ball joint mount
113—stem of upper axle ball joint mount 112
114—frame structure of vehicle
116—solid front axle
118—frame mount location 120—grease seal
121—bottom of upper axle ball joint support box 102
122—angled portion of upper axle ball joint support torque box 102
123—angled faces of angled portion 122
124—Ball joint rod end of forward torque rod 106
125—Ball swivel
126—bolts
127—nut
128—opening defined by torque rod support 104
129—cylindrical hole defined by ball swivel 125, having longitudinal axis A-A
130—opening of forward torque rod 106
131—openings defined by torque tube 110
132—bolts
133—nuts
134—grease seal housing (goes around grease seal 120 and sleeve bearing end 135)
135—sleeve bearing ends of torque tube support housing 108
138—anti-twist bracket
140—lip of torque rod support 104
142—hole defined along face 158 of forward torque rod support 104
143—face of forward torque rod support 104
145—face of forward torque rod support 104
147—face of lip 140 of forward torque rod support 104
148—hole defined along face 158 of forward torque rod support 104
150—hole defined along face 158 of forward torque rod support 104
152—hole defined along face 158 of forward torque rod support 104
154—hole defined along face 158 of forward torque rod support 104
158—face of forward torque rod support 104
160—hole defined along face 168 of forward torque rod support 104
162—hole defined along face 168 of forward torque rod support 104
164—hole defined along face 168 of forward torque rod support 104
168—face of forward torque rod support 104
170—bracket plate of forward torque rod support 104
172—bracket plate of forward torque rod support 104
174—bolt and nut combination
176—plate of torque tube support housing 108
178—face of upper axle ball joint support torque box 102
180—bolt and nut combination
182—bolts
184—nuts
190—suspension spring
192—shock absorber

EXAMPLES

Example 1—A 2001 Jeep Wrangler was modified by replacing the stock suspension springs with four (4) inch lift springs. While driving on a freeway at 55 miles per hour, the vehicle would shake side-to-side. The vehicle also shook from side-to-side at a greater frequency when braking. Following the driving of the modified vehicle with four (4) inch lift springs, an inspection of the vehicle did not reveal any worn, broken or defectively made parts.

Example 2—The same vehicle used in Example 1 was modified as follows. Every steering and suspension component of the vehicle was replaced with after-market components designed for modified lifted Jeeps, including four (4) inch lift springs. After each component change, the alignment of the vehicle was checked. The vehicle was then driven at 55 miles per hour on the same freeway as in Example 1, and the vehicle would shake side-to-side similar to Example 1. The vehicle also shook from side-to-side at a greater frequency when braking. Once the suspension springs started to oscillate from side-to-side, the shake problem is amplified. Following this driving test, an inspection of the vehicle did not reveal any worn, broken or defectively made parts.

Example 3—The same vehicle used in Example 2 was then modified as follows. The components identified in FIGS. 1-6C and discussed above were installed without removing suspension and steering components previously installed in Example 2. While driving on the same freeway at 55 miles per hour as in Examples 1 and 2, the vehicle handled much better than in Examples 1 and 2. With installation of the components identified in FIGS. 1-6C and discussed above, the side-to-side shake of the vehicle was reduced from four (4) to six (6) inches in Examples 1 and 2 to no more than about 0.5 inches. When the brakes were applied, the vehicle did not shake or oscillate at all. This was a surprising result in Example 3 because in Examples 1 and 2, braking made oscillation worse.

In an embodiment, the forward torque rod support may be installed onto the frame of a vehicle using a structural high strength adhesive. The high strength adhesive acts to seal the rod support to prevent or reduce the effects of moisture and corrosion. In addition, the structural high strength adhesive helps make the rod supports an integral part of the frame structure.

In an embodiment, one of the bolts installed on a frame-mounted rod support is installed after the rod support is connected to the vehicle frame. This bolt may be a "lock" bolt. A "lock" bolt hole is drilled, and threads are tapped together for the rod support and the vehicle frame. Tapping or thread cutting after the rod support is installed locks the rod support and the vehicle frame together, not allowing the rod support to become loose.

In an embodiment, the assembly disclosed herein may be installed by one front axle ball joint, e.g., either the driver-side or passenger-side front axle ball joint. In another embodiment, two assemblies may be installed—one assembly may be installed by the driver-side front ball joint, and the other assembly may be installed by the passenger-side front axle ball joint.

The assembly disclosed herein can be installed on solid front axle vehicles without removing suspension or steering components previously installed. With installation of the assembly disclosed herein, factory installed parts as well as after-market parts and installation points can remain untouched. The assembly disclosed herein can be installed at the vehicle manufacturing plant, or point of sale (e.g., a car dealership), or as an aftermarket kit.

In an embodiment, installation of the assembly may comprise the following steps, and with reference to the figures:
1. Remove upper ball joint in accordance with the vehicle's current maintenance instructions.
2. Locate and mark with a marker where the torque rod support will be installed on the specific vehicle.
3. Thoroughly clean this area to allow adhesive to adhere to frame.
4. Place brackets in place and clamp with C-clamps so brackets are flush against frame on both contact surfaces.

5. Match drill into the frame with the bracket in place, through the pre-drilled pilot holes (see e.g., in holes 148, 150, 152, 154, 160, 162, and 164 (previously discussed and depicted in the figures) using the provided drill bit.
6. Remove clamps and remove forward torque rod support.
7. *Note: do not tap hole 152 shown in FIG. 6B, and hole 162 shown in FIG. 6C at this step because it will be tapped after part is installed.
8. With the forward torque rod support removed, using a 5/16 tap provided tap holes 148, 150, 154, 160, and 164.
9. With the bracket removed, drill the bracket holes 148, 150, 154, 160, and 164 with a provided 5/16 drill bit.
10. Clean both mating surface of the frame and bracket.
11. Mix and apply the provided structural epoxy to both mating surfaces.
12. Place the forward torque rod support and draw in evenly with the bolts with a step tightening process. Final torque is 120-inch lbs.
13. Lock bolt installation. Drill holes 152 and 162 with the provided 5/16 drill bit. Tap threads of the bracket and frame together with the 3/8 tap. Clean threads with alcohol; apply provided thread lock to bolt threads. Torque to 40-foot lbs.
14. Install torque box ball joint.
15. Install forward torque rod, adjust to allow bolts to slide in with no force.

Multiple variations of the aspects and features of the invention are possible and are considered to be within the scope of the invention. For example, the size and shape of components of the assembly disclosed herein may be varied. As a consequence, the invention is to be limited only by the following claims and equivalents thereof.

What is claimed is:

1. An assembly kit comprising:
an upper axle ball joint support torque box;
a torque tube;
a torque tube support housing;
a forward torque rod; and
a forward torque rod support;
wherein the upper axle ball joint support torque box is configured to be connected to an upper axle ball joint mount of a solid front axle of a vehicle;
wherein the torque tube support housing is configured to be connected to the upper ball joint support torque box;
wherein the forward torque rod comprises a first end configured to be connected to a forward portion of the torque tube;
wherein the forward torque rod comprises a second end configured to be connected to the forward torque rod support; and
wherein the forward torque rod support is configured to be connected to a frame structure of a vehicle.

2. The assembly kit of claim 1, wherein the upper axle ball joint support box comprises a bottom and an angled portion, wherein the bottom has a pentagon shape.

3. The assembly kit of claim 2, wherein the angled portion comprises two angled sides perpendicular to the bottom.

4. The assembly kit of claim 1, wherein the torque rod support housing comprises two sleeve bearing ends.

5. The assembly kit of claim 4, wherein the torque rod support housing comprises a two grease seals and two grease seal housings, wherein each grease seal housing goes around a corresponding sleeve bearing end and corresponding grease seal.

6. The assembly kit of claim 1, wherein the torque tube support housing is configured to slide forward and backward along the torque tube.

7. The assembly kit of claim 1, wherein the second end of the forward torque rod comprises a ball joint rod end, wherein the ball joint rod end comprises a ball swivel, wherein the ball swivel defines a cylindrical hole through the ball joint, wherein the cylindrical hole has a longitudinal axis, wherein the forward torque rod is configured to pivot up and down about the longitudinal axis of the cylindrical hole.

8. The assembly kit of claim 1, wherein the forward torque rod comprises a telescoping structure, wherein the forward torque rod is adjustable by adjusting the length of the forward torque rod with the telescoping structure.

9. The assembly kit of claim 1, wherein the telescoping structure is a threaded shaft, wherein the threaded shaft is configured to telescope out of the forward torque rod to adjust the length of the forward torque rod so its length is greater, and wherein the threaded shaft is configured to telescope into forward torque rod to adjust the length of the forward torque rod so its length is shorter.

10. The assembly kit of claim 1, wherein the forward torque rod support has one or more faces comprising a structural high strength adhesive.

11. The assembly kit of claim 1, further comprising an anti-twist bracket, wherein the anti-twist bracket is configured to connect to the upper ball joint support box and to capture an upper axle ball joint mount of a vehicle having a solid front axle.

12. A system comprising:
an upper axle ball joint support torque box;
a torque tube;
a torque tube support housing;
a forward torque rod; and
a forward torque rod support;
wherein the upper axle ball joint support torque box is configured to be connected to an upper axle ball joint mount of a solid front axle of a vehicle;
wherein the torque tube support housing is connected to the upper ball joint support torque box;
wherein the forward torque rod comprises a first end, wherein the first end is connected to a forward portion of the torque tube;
wherein the forward torque rod comprises a second end, wherein the second end is connected to the forward torque rod support; and
wherein the forward torque rod support is configured to be connected to a frame structure of a vehicle.

13. The system of claim 12,
wherein the upper axle ball joint support torque box is connected to an upper axle ball joint mount of a solid front axle of a vehicle, wherein the forward torque rod support is connected to a frame structure of the vehicle.

14. The system of claim 13, wherein
when the upper axle ball joint mount rises, the upper axle ball joint support box rises, the torque tube housing slides forward towards the front of the vehicle, and the forward torque rod pivots upward, and
when the upper axle ball joint mount descends, the upper axle ball joint support box descends, the torque tube housing slides backward towards the rear of the vehicle, and the forward torque rod pivots downward.

15. The system of claim 14, wherein the forward torque rod support is connected to a location of the frame structure, wherein the location of the frame structure is closer to the front of the vehicle than the upper axle ball joint mount.

16. The system of claim 15, wherein the location is on the frame structure above the upper ball joint support torque box.

17. The system of claim 13, wherein the forward torque rod support is attached to the frame structure of the vehicle by a structural high strength adhesive.

18. The system of claim 13, wherein the vehicle has a raised suspension.

19. The system of claim 13, wherein the vehicle comprises lift springs to raise the suspension of the vehicle.

20. The system of claim 19, wherein the lift springs raise the suspension of the vehicle by at least about four inches.

21. The system of claim 12, further comprising an anti-twist bracket, wherein the anti-twist bracket is configured to connect to the upper ball joint support box and to capture an upper axle ball joint mount of a vehicle having a solid front axle.

22. The system of claim 21, wherein the anti-twist bracket is connected to the upper ball joint support box and captures an upper axle ball joint mount of the vehicle having a solid front axle.

* * * * *